United States Patent
Harada et al.

(10) Patent No.: US 9,461,514 B2
(45) Date of Patent: Oct. 4, 2016

(54) BOBBIN AND ROTARY ELECTRIC MACHINE

(71) Applicant: KABUSHIKI KAISHA YASKAWA DENKI, Kitakyushu-shi (JP)

(72) Inventors: Manabu Harada, Fukuoka (JP); Masanobu Kakihara, Fukuoka (JP); Kensuke Nakazono, Fukuoka (JP); Youichi Sakamoto, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 286 days.

(21) Appl. No.: 14/161,689

(22) Filed: Jan. 23, 2014

(65) Prior Publication Data
US 2014/0210303 A1   Jul. 31, 2014

(30) Foreign Application Priority Data
Jan. 31, 2013   (JP) ................................. 2013-016687

(51) Int. Cl.
H02K 3/34       (2006.01)
H02K 3/52       (2006.01)

(52) U.S. Cl.
CPC .............. H02K 3/345 (2013.01); H02K 3/522 (2013.01)

(58) Field of Classification Search
CPC ........... H02K 3/345; H02K 3/38; H02K 3/48
USPC ....................................................... 310/215
See application file for complete search history.

(56) References Cited

U.S. PATENT DOCUMENTS

| 3,339,097 A * | 8/1967 | Dunn ..................... H02K 3/522 29/596 |
| 2003/0001708 A1 | 1/2003 | Onaya et al. |
| 2012/0319507 A1* | 12/2012 | Ueno ..................... H02K 3/345 310/43 |

FOREIGN PATENT DOCUMENTS

| JP | 09-308142 | 11/1997 |
| JP | 2000-316246 | 11/2000 |
| JP | 2002-101590 | 4/2002 |
| JP | 4683410 B2 | 10/2006 |
| JP | 2006-340581 | 12/2006 |
| JP | 2010-057211 | 3/2010 |
| JP | 2010-246269 | 10/2010 |
| JP | 2011-103712 | 5/2011 |
| JP | 2011-254689 | 12/2011 |

OTHER PUBLICATIONS

Korean Office Action for corresponding KR Application No. 10-2014-0011174, Jun. 24, 2015.
Japanese Office Action for corresponding JP Application No. 2013-016687, Mar. 27, 2014.
Chinese Office Action for corresponding CN Application No. 201410043568.1, Nov. 19, 2015.
Chinese Office Action for corresponding CN Application No. 201410043568.1, Jul. 26, 2016.

* cited by examiner

*Primary Examiner* — Hanh Nguyen
(74) *Attorney, Agent, or Firm* — Mori & Ward, LLP (57) ABSTRACT

A bobbin is adapted to be mounted to a projection of a stator core of a rotary electric machine and wound with a coil wire. The bobbin includes a back stress generating portion configured to generate a stress acting in a direction opposite to a stress generated when the coil wire is wound around the bobbin.

16 Claims, 13 Drawing Sheets

BOBBIN AND ROTARY ELECTRIC MACHINE

CROSS-REFERENCE TO RELATED APPLICATION

The present disclosure contains subject matter related to that disclosed in Japanese Priority Patent Application No. 2013-016687 filed with the Japan Patent Office on Jan. 31, 2013, the entire contents of which are incorporated herein by reference.

BACKGROUND OF THE INVENTION

1. Field of the Invention

Embodiments disclosed herein relate to a bobbin and a rotary electric machine provided with the bobbin.

2. Description of the Related Art

In the field of a rotary electric machine, there is known a bobbin that electrically insulates an armature coil and an armature core (see, e.g., Japanese Patent Application Publication H09-308142).

SUMMARY OF THE INVENTION

In accordance with an aspect of the embodiments disclosed herein, there is provided a bobbin adapted to be mounted to a projection of a stator core of a rotary electric machine and wound with a coil wire, the bobbin including a back stress generating portion configured to generate a stress acting in a direction opposite to a stress generated when the coil wire is wound around the bobbin.

Further, in accordance with another aspect of the embodiments, there is provided a rotary electric machine which includes a stator, a rotor and the aforementioned bobbin.

DESCRIPTION OF THE EMBODIMENTS

Embodiments of the present disclosure will now be described in detail with reference to the accompanying drawings.

Outlined Configuration of Rotary Electric Machine

First, the configuration of a rotary electric machine according to an embodiment will be described with reference to FIGS. 1 to 3.

Figure 1:
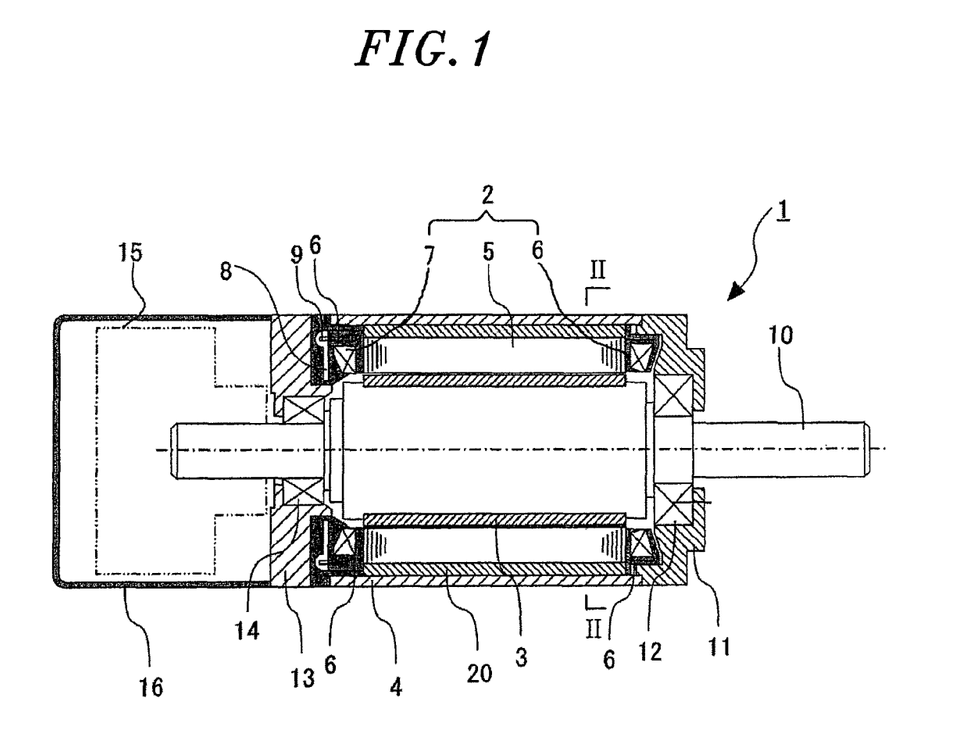
FIG. 1 is an axially-taken cross-sectional view showing the overall configuration of a rotary electric machine provided with a bobbin in accordance with an embodiment.
Figure 2:
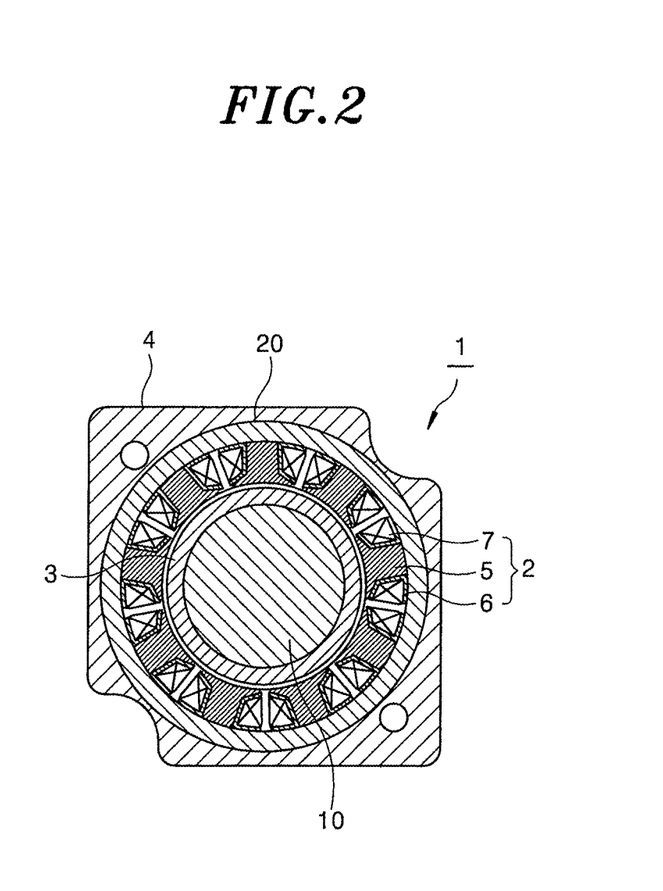
FIG. 2 is a cross sectional view of the rotary electric machine taken along line II-II in FIG. 1.

As shown in FIGS. 1 and 2, the rotary electric machine 1 includes a stator 2 and a rotor 3. The rotary electric machine 1 is an inner-rotor-type motor in which the rotor 3 is arranged inside the stator 2. The rotary electric machine 1 may not be a motor but a generator. The stator 2 is provided on an inner circumferential surface of a frame 4 so as to radially face the rotor 3.

The stator 2 includes a laminated core body 5 (corresponding to a stator core), a plurality of bobbins 6 mounted to the laminated core body 5, a coil wire 7 wound around each of the bobbins 6, and a laminated core ring 20. The bobbins 6 are made of an insulating material so as to electrically insulate the laminated core body 5 and the coil wire 7.

A board 8 is provided at the counter-load side (at the left side in FIG. 1) of the bobbins 6 opposite to the load side where a load is provided. The circuit arranged in the board 8 and each of the coil wires 7 wound around the respective bobbins 6 are electrically connected to each other through two pin terminals 9. A winding start end and a winding finish end (not shown) of the coil wire 7 are wrapped around the corresponding pin terminals 9 and are fixed to the corresponding pin terminals 9 by solders or the like.

In the present embodiment, the rotor 3 is formed of a permanent magnet and is provided on the outer circumferential surface of a shaft 10. An outer race of a load-side bearing 12 is fitted to a load-side bracket 11 provided at the load side (the right side in FIG. 1) of the frame 4. An outer race of a counter-load-side bearing 14 is fitted to a counter-load-side bracket 13 provided at the counter-load side of the frame 4. The shaft 10 is rotatably supported by the load-side bearing 12 and the counter-load-side bearing 14. An encoder 15 is provided at the counter-load-side end portion of the shaft 10. The encoder 15 is covered with an encoder cover 16.

Figure 3:
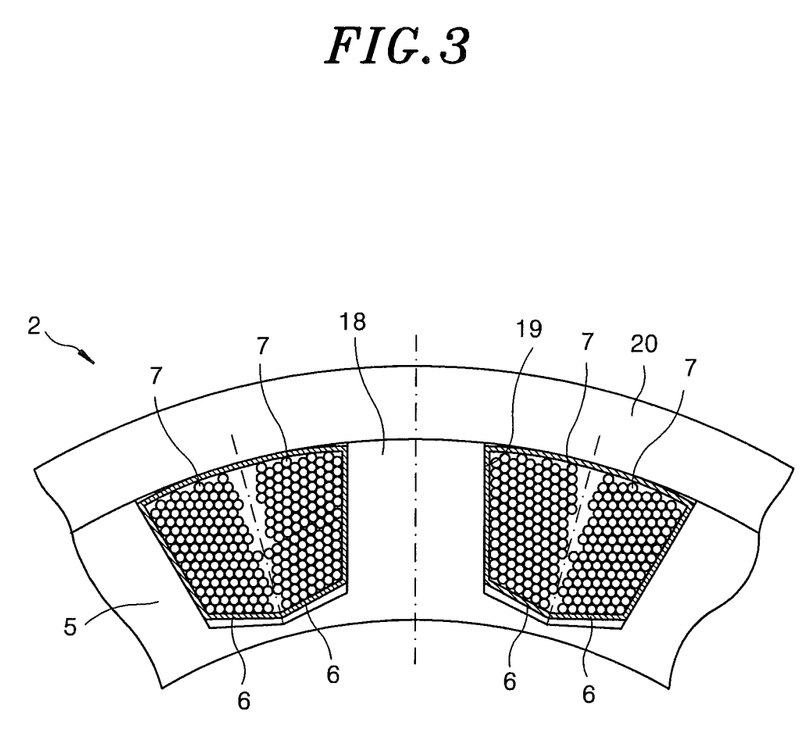
FIG. 3 is an enlarged cross sectional view showing major parts of the rotary electric machine shown in FIG. 2.

As shown in FIG. 3, the laminated core body 5 is provided with a plurality of (nine, in the present embodiment) radial projections (teeth) 18 which protrude radially outward. The projections 18 are formed to extend along the axial direction of the laminated core body 5 (along the left-right direction in FIG. 1). The bobbins 6 wound with the coil wire 7 are mounted to the respective projections 18 from the radial outer side.

A plurality of (nine, in the present embodiment) recesses (slots) 19 are formed between the adjoining projections 18. In each of the recesses 19, the opposite side portions of the winding layers of the coil wires 7 (corresponding to the side surfaces 21L and 21R of a body portion 21 of the bobbin 6 to be described later) (see FIGS. 4A and 4B), which are wound around the adjoining bobbins 6 mounted on the adjoining projections 18, are circumferentially arranged with a gap therebetween.

In the aforementioned manner, the bobbins 6 wound with the coil wire 7 are mounted to the laminated core body 5 and are then fixed to the inner circumferential surface of the laminated core ring 20 having an annular shape, thereby forming the stator 2. The stator 2 thus formed is attached to the inner circumferential surface of the frame 4. Thereafter, a resin is introduced into the recesses 19 of the laminated core body 5, whereby the bobbins 6 and the coil wire 7 are molded with the resin.

Detailed Configuration of the Bobbins

Figure 4A:
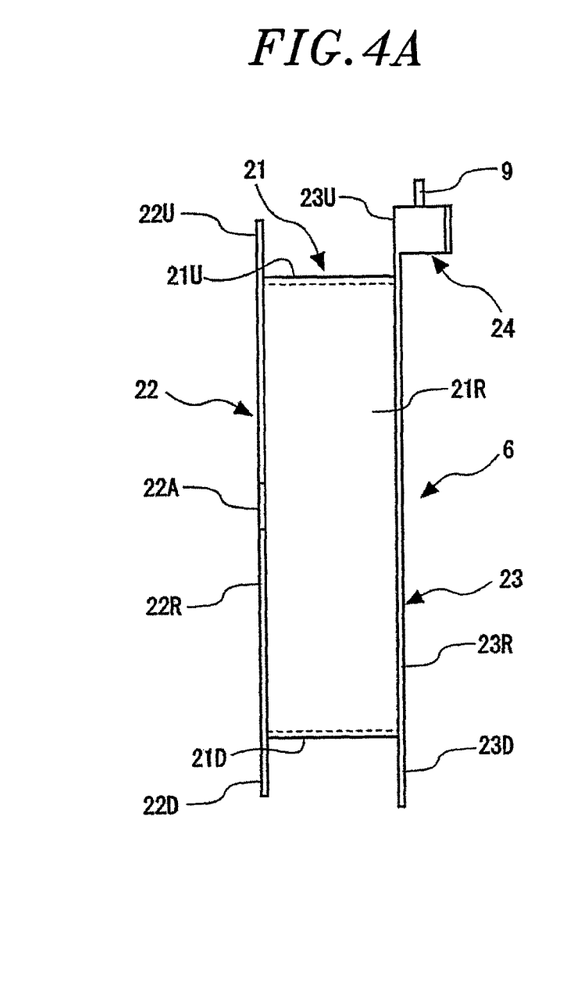
FIGS. 4A and 4B are side and front views showing the detailed structure of the bobbin according to the embodiment.
Figure 4B:
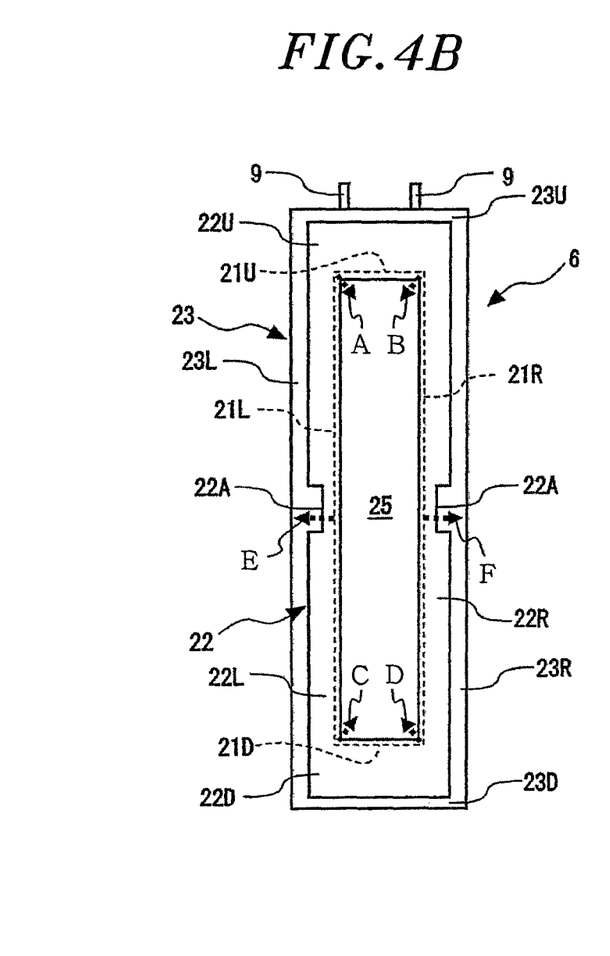
Figure 5:
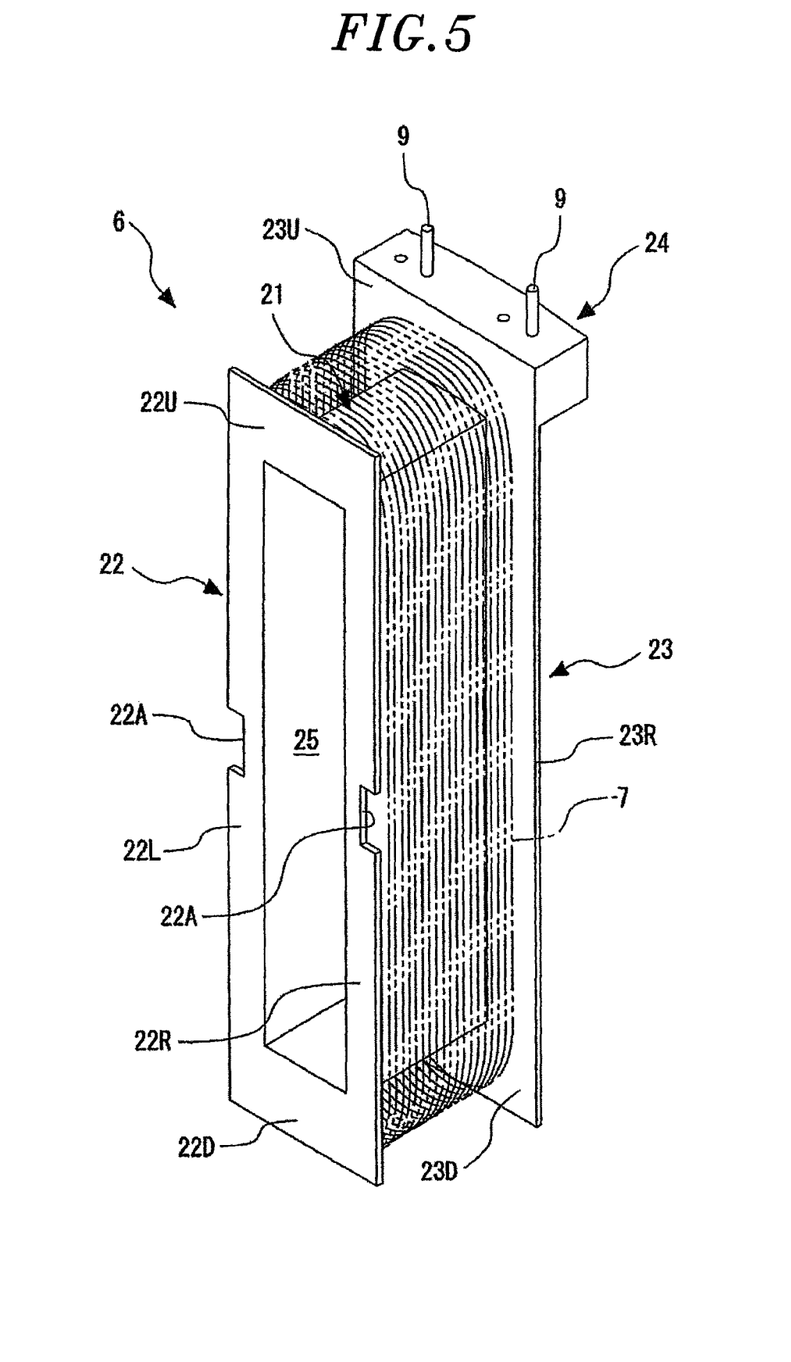
FIG. 5 is a perspective view showing the detailed structure of the bobbin according to the embodiment.

Next, the bobbins 6 as major parts of the present embodiment will be described with reference to FIGS. 4A to 5. As shown in FIGS. 4A to 5, each of the bobbins 6 includes a substantially quadrilateral frame-like body portion 21 provided with a hollow portion 25 and wound with the coil wire 7, and a flange provided in at least one (both, in the present embodiment) of both ends (the left and right ends in FIG. 4A) of the opening of the hollow portion 25. More specifically, the flange includes a first flange 23 and a second flange 22 smaller in outer dimension than the first flange 23. The first flange 23 is provided with a resin-made board mounting portion 24 to which the board 8 (see FIG. 1) is mounted.

The body portion 21 is formed into a hollow prismatic shape. The projection 18 (see FIG. 3) of the laminated core body 5 is positioned in the hollow portion 25. The body portion 21 includes two side surfaces 21U and 21D which are opposite to each other in the axial direction of the stator 2 (in the left-right direction in FIG. 1 and in the up-down direction in FIGS. 4A and 4B) and correspond to the short sides of the rectangular in FIG. 4B (hereinafter simply referred to as a "short side"), and two side surfaces 21L and 21R which are opposite to each other in the direction orthogonal to the axial direction (in the left-right direction in FIG. 4B) and correspond to the long sides of the rectangular in FIG. 4B (hereinafter simply referred to as a "long side"). The corners defined by the respective side surfaces 21U, 21D, 21L and 21R of the body portion 21 may be formed into a curved shape (a round shape or a chamfered shape) so as to relieve the stresses generated by the winding of the coil wire 7.

The first flange 23 is provided around one end (the right end in FIG. 4A) of the hollow portion 25 of the body portion 21. In the present embodiment, the first flange 23 is formed of a thin plate made of an insulating material. The first flange 23 includes short-side flat plate portions 23U and 23D and long-side flat plate portions 23L and 23R. The board mounting portion 24 is provided at the rear surface (the right side in FIG. 4A) of one short-side flat plate portion 23U. Two pin terminals 9 protrude outward in the longitudinal direction (upward in FIG. 4B) from the board mounting portion 24.

The second flange 22 is provided around the other end (the left end in FIG. 4A) of the hollow portion 25 of the body portion 21. In the present embodiment, the second flange 22 is formed of a thin plate made of an insulating material. The second flange 22 includes two short-side flat plate portions 22U and 22D and two long-side flat plate portions 22L and 22R.

In the aforementioned configuration, the coil wire 7 begins to be wound using the end thereof wrapped around one of the pin terminals 9 as a winding start end. The coil wire 7 encircles the body portion 21 and is wound around the body portion 21 by repeating the encircling a predetermined number of times. The winding finish end of the coil wire 7 is wrapped around the other pin terminal 9. Both ends of the coil wire 7 are fixed to the respective pin terminals 9 by solders or the like.

In the present embodiment, a back stress generating portion is configured such that the portion of the bobbin 6, where the back stress generating portion is provided, is easily deformed outward or inward of the bobbin 6. More specifically, cutout recesses 22A opened outward are formed in the outer peripheral regions of the flat plate portions 22L and 22R of the second flange 22. The recesses 22A (the long-side recesses) are formed in the longitudinal center portions of the long-side flat plate portions 22L and 22R. The recesses 22A serve as back stress generating portions that generate stresses in the opposite direction to the stresses acting on the body portion 21 due to the winding of the coil wire 7.

That is to say, when the coil wire 7 is wound around the body portion 21, stresses (loads) acting toward the internal center of the hollow portion 25 are generated in the corners defined by the respective side surfaces 21U, 21D, 21L and 21R of the body portion 21, namely in the portions indicated by arrows "A", "B", "C" and "D" in FIG. 4B. Thus, there is likelihood that the long side surfaces 21L and 21R of the body portion 21 are bend outward (see arrows "E" and "F" in FIG. 4B) by the stresses generated in the corners of the body portion 21, whereby the body portion 21 as a whole is deformed into a barrel-like shape. If the thickness of the body portion 21 is increased in order to prevent such deformation of the body portion 21, the space factor of the coil wire 7 becomes smaller.

In the present embodiment, the recesses 22A are formed in the long-side flat plate portions 22L and 22R. Thus, when the tension of the coil wire 7 wound around the body portion 21 acts on each of the bobbins 6 and when the body portion 21 receives stresses (loads) acting toward the internal center from the corner portions thereof, the long side surfaces 21L and 21R of the body portion 21 are apt to be deformed inwardly.

That is to say, the recesses 22A deforms in the opposite direction to the deformation direction of each of the bobbins 6. This makes it possible to cancel the deformation of each of the bobbins 6. Even if the long-side flat plate portions 22L and 22R are slightly bent inward, the body portion 21 is easily returned to the original shape when the projection 18 of the laminated core body 5 is positioned in the hollow portion 25. As a result, the spaced-apart distance between the adjoining bobbins 6 is kept constant.

As described above, according to the present embodiment, the recesses 22A as the back stress generating portions for generating stresses in the opposite direction to the stresses generated in the remaining portions are provided in certain peripheral portions (the flat plate portions 22L and 22R in the present embodiment) of the second flange 22 of each of the bobbins 6. Accordingly, when the tension of the wound coil wire 7 is exerted on each of the bobbins 6, the recesses 22A deform in the opposite direction to the deformation direction of each of the bobbins 6. This makes it possible to cancel the deformation of each of the bobbins 6.

In the present embodiment, the recesses 22A are formed in the portions of the second flange 22 which may otherwise be deformed outward of each of the bobbins 6 by the tension of the coil wire 7. Thus, the portions of the second flange 22 where the recesses 22A are formed can be easily deformed inward. Accordingly, the deformation of the bobbin 6 otherwise caused by the tension of the wound coil wire 7 can be suppressed without having to increase the thickness of the bobbin 6.

Thus, it is possible to reduce the size of the rotary electric machine 1 while increasing the space factor of the coil wire 7. Since the deformation of the bobbin 6 can be suppressed, it is possible to reduce generation of cracks in the bobbin 6 and accidental separation of the bobbin 6 from the laminated core body 5. As a result, it is possible to prevent generation of a poor electrical safety or a poor work.

In the present embodiment, the recesses 22A are formed in the outer peripheral regions of the long-side flat plate portions 22L and 22R. Thus, the long-side flat plate portions 22L and 22R of the second flange 22 become partially thinner (narrower in width) due to the existence of the recesses 22A. This enables the recesses 22A to serve as the back stress generating portions with ease. Since the recesses 22A are formed in the outer peripheral regions of the long-side flat plate portions 22L and 22R, it is possible to easily generate bending stresses acting in the direction opposite to the outward deformation of the bobbin 6. This makes it possible to suppress the outward deformation of the bobbin 6.

As described above, if the body portion 21 has a quadrilateral frame-like shape (a rectangular shape when seen from the front side as in FIG. 4B), the body portion 21 undergoes greatest deformation in the substantially central regions of the portions corresponding to the short side or the long side. In the present embodiment, the recesses 22A are provided in the longitudinal central regions of the long-side flat plate portions 22L and 22R. By providing the recesses 22A in the most deformable positions, it is possible to effectively suppress deformation of the bobbins 6.

In the present embodiment, the recesses 22A are formed in the second flange 22 smaller in outer dimension and rigidity than the first flange 23. This makes it possible to more effectively suppress deformation of the bobbin 6.

Modified Examples

Embodiments disclosed herein are not limited to the foregoing but may be modified in many different forms without departing from the spirit and technical concept of the present disclosure. Different modified examples will now be described one after another.

Figure 6A:
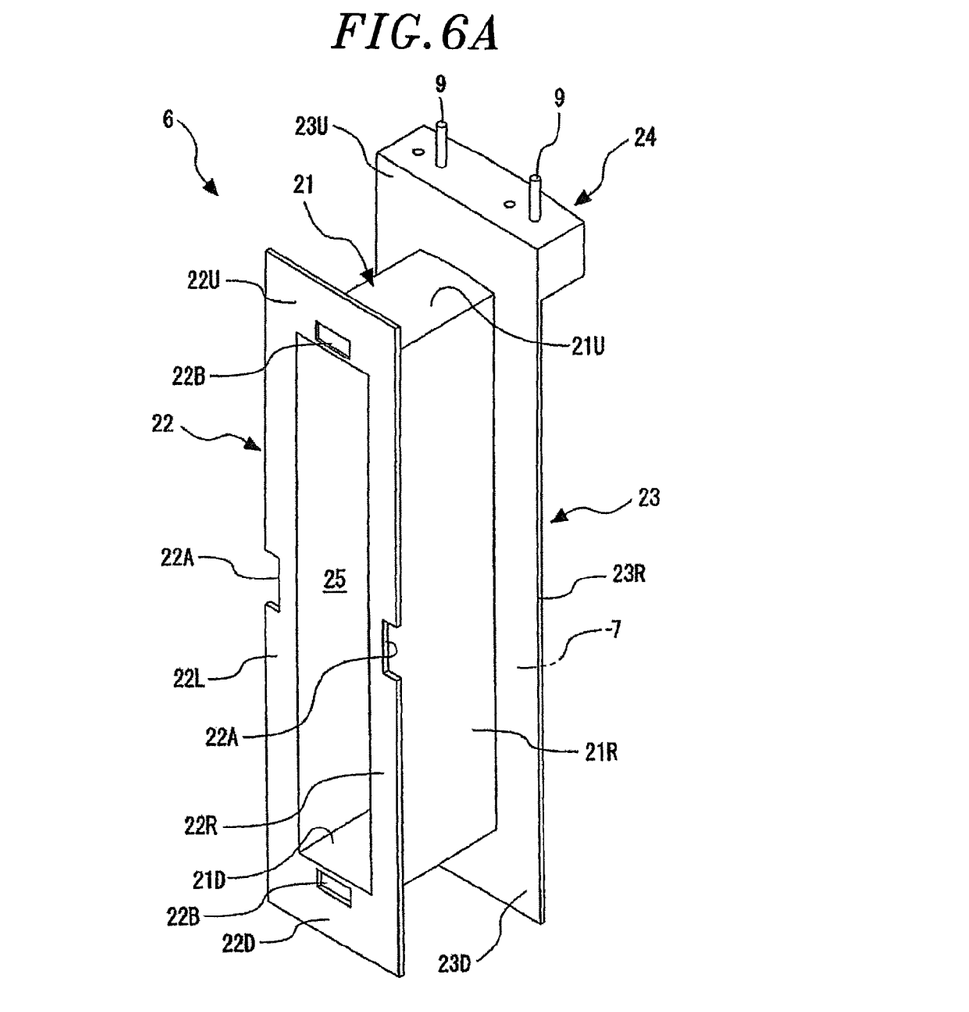
FIGS. 6A and 6B are a perspective view and an enlarged sectional view of major parts showing the detailed structure of a bobbin according to a modified example, in which back stress generating portions are formed in long-side flat plate portions and short-side flat plate portions of a flange.
Figure 6B:
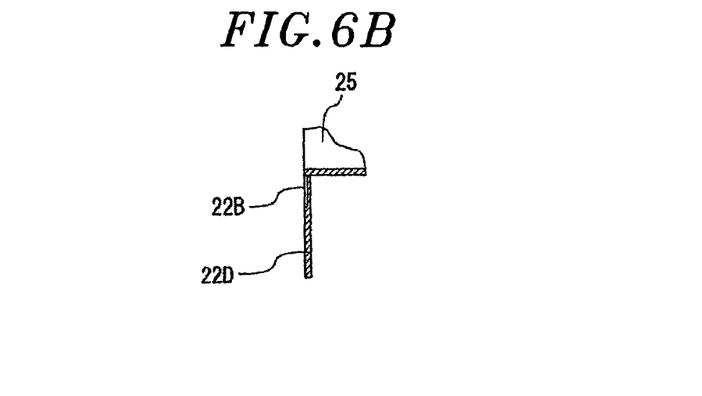

(1) Formation of Back Stress Generating Portions in the Long-Side Flat Plate Portions and the Short-Side Flat Plate Portions In the present modified example, as shown in FIG. 6A, the second flange 22 of each of the bobbins 6 includes not only the recesses 22A formed in the long-side flat plate portions 22L and 22R just like the aforementioned embodiment but also recesses 22B (corresponding to back stress generating portions) formed in the short-side flat plate portions 22U and 22D near the side surfaces 21U and 21D (namely, at the inner periphery). In the present modified example, as shown in FIG. 6B, the recesses 22B (the short-side recesses) are formed by making certain portions of the short-side flat plate portions 22U and 22D thinner than the remaining portions. Alternatively, the recesses 22B may be through-holes. Moreover, the recesses 22B may be formed into a cutout shape just like the recesses 22A of the flat plate portions 22L and 22R.

According to the present modified example, as with the aforementioned embodiment, the recesses 22A are formed in the long-side flat plate portions 22L and 22R which are easily deformed outward by the tension of the wound coil wire 7 due to the aforementioned behavior. This enables the long-side flat plate portions 22L and 22R to be easily deformed inward of the bobbin 6. In addition, the recesses 22B are formed in the short-side flat plate portions 22U and 22D. This enables the long-side flat plate portions 22L and 22R to be easily deformed inward of the bobbin 6. Thus, it is possible to enhance the effect of cancelling the deformation at the long side and the short side of the second flange 22. Moreover, it is possible to reliably suppress the deformation of the bobbin 6 without having to increase the thickness of the bobbins 6.

Figure 7:
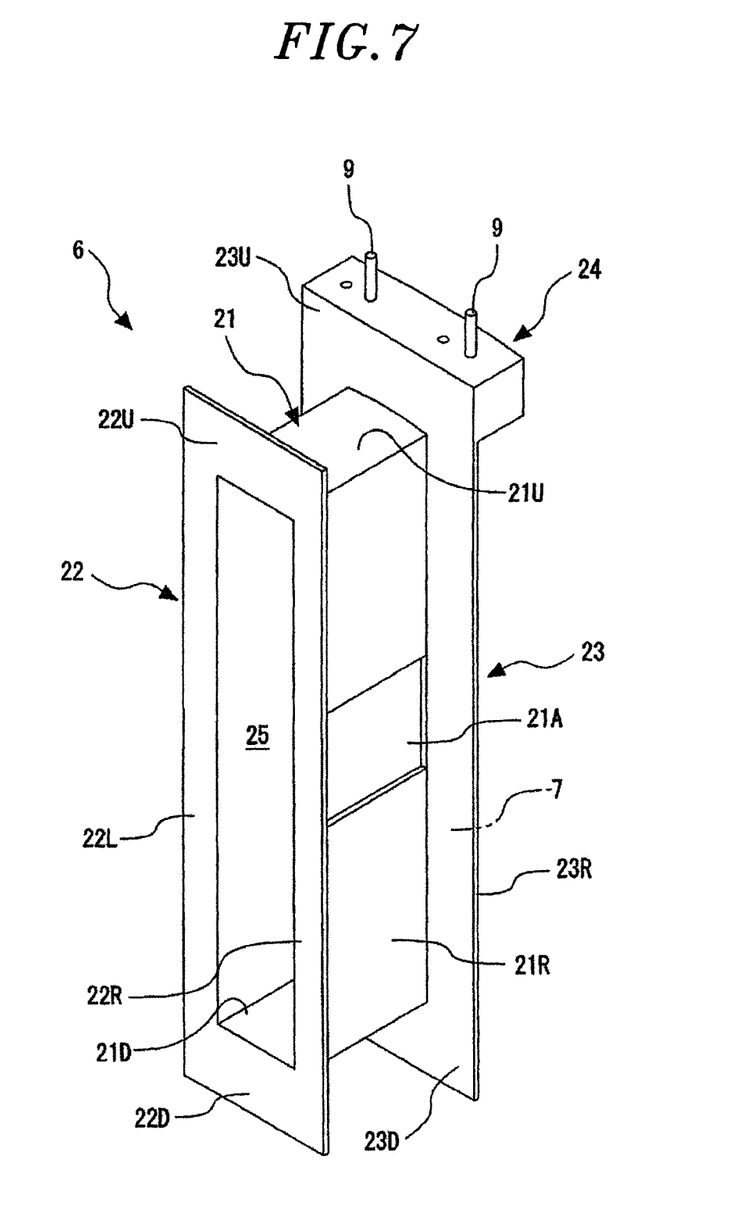
FIG. 7 is a perspective view showing the detailed structure of a bobbin according to another modified example, in which back stress generating portions are formed in long side surfaces of a body portion.

(2) Formation of Back Stress Generating Portions in the Long Side Surfaces of the Body Portion In the aforementioned embodiment and the modified example (1), the recesses 22A and/or the recesses 22B as the back stress generating portions are formed in the second flange 22 of each of the bobbins 6. However, the present disclosure is not limited thereto. In the present modified example, as shown in FIG. 7, recesses 21A (long-side recesses) as back stress generating portions are provided in the long side surfaces 21L and 21R of the body portion 21 of each of the bobbins 6 (only the side surface 21R is shown in FIG. 7).

In the present modified example, the recesses 21A are formed in the long side surfaces 21L and 21R which are easily deformed outward by the tension of the wound coil wire 7 as described above. This enables the long side surfaces 21L and 21R to be easily deformed inward of the bobbin 6. Thus, as with the aforementioned embodiment, the deformation of the bobbin 6 caused by the tension of the wound coil wire 7 can be suppressed without having to increase the thickness of the bobbin 6.

Figure 8A:
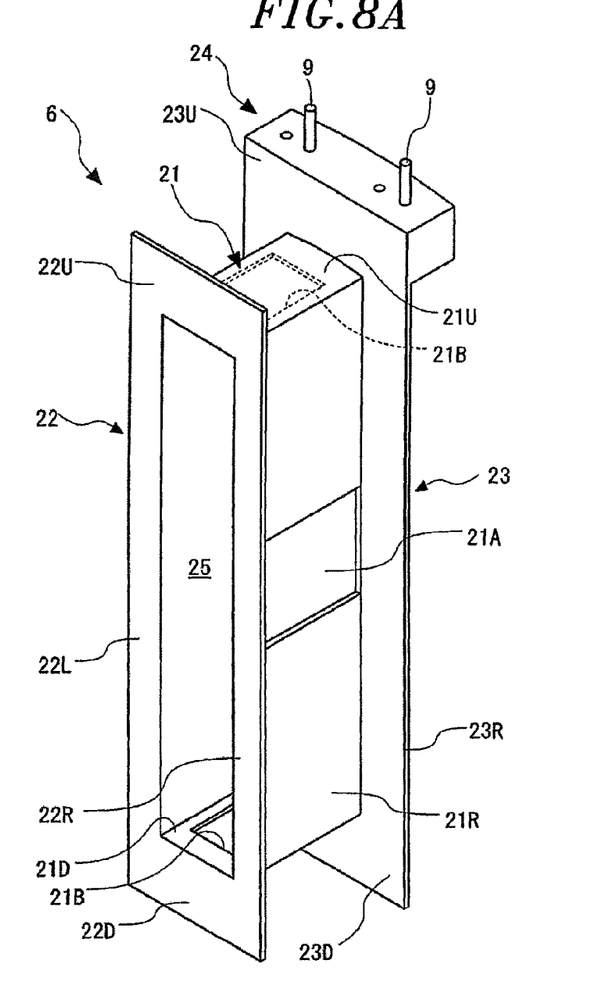
FIGS. 8A and 8B are a perspective view and an enlarged sectional view of major parts showing the detailed structure of a bobbin according to a further modified example, in which back stress generating portions are formed in long side surfaces and short side surfaces of a body portion.
Figure 8B:
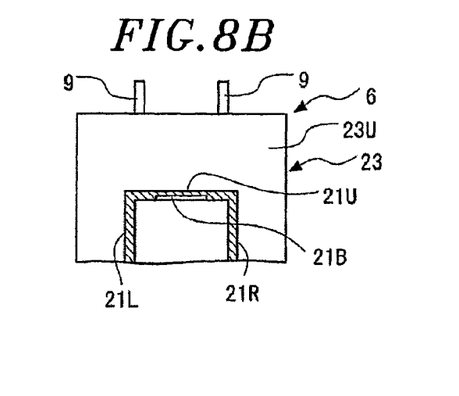

(3) Formation of Back Stress Generating Portions in the Long and Short Side Surfaces of the Body Portion In the present embodiment, as shown in FIG. 8A, the body portion 21 of each of the bobbins 6 includes not only the recesses 21A formed in the long side surfaces 21L and 21R as in the modified example (2) but also recesses 21B (short-side recesses) as back stress generating portions formed in the short side surface 21U and 21D. As shown in FIG. 8B, the recesses 21B are formed by making certain portions of the short-side flat plate portions 21U and 21D thinner than the remaining portions. Alternatively, the recesses 21B may be through-holes. Moreover, the recesses 21B may be formed into a cutout shape just like the recesses 22A of the flat plate portions 22L and 22R.

According to the present modified example, as described above, the recesses 21A are formed in the long side surfaces 21L and 21R which are easily deformed outward by the tension of the wound coil wire 7. This enables the long side surfaces 21L and 22R to be easily deformed inward of the bobbin 6. In addition, the recesses 21B are formed in the short side surfaces 21U and 21D. This enables the long side surfaces 21L and 22R to be easily deformed inward of the bobbin 6. Thus, it is possible to enhance the effect of cancelling the deformation at the long side and the short side of the body portion 21. Moreover, it is possible to more reliably suppress the deformation of the bobbins 6 without having to increase the thickness of the bobbins 6.

(4) Formation of Back Stress Generating Portions in the First Flange

Figure 9A:
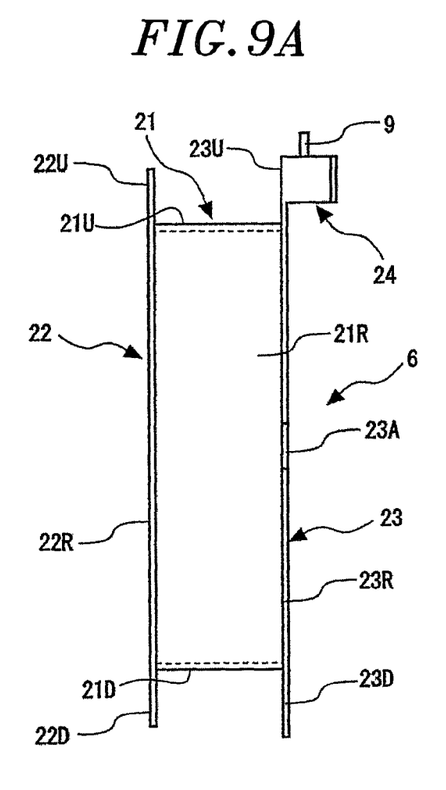
FIGS. 9A and 9B are side and front views showing the detailed structure of a bobbin according to a still further modified example, in which back stress generating portions are formed in a first flange.
Figure 9B:
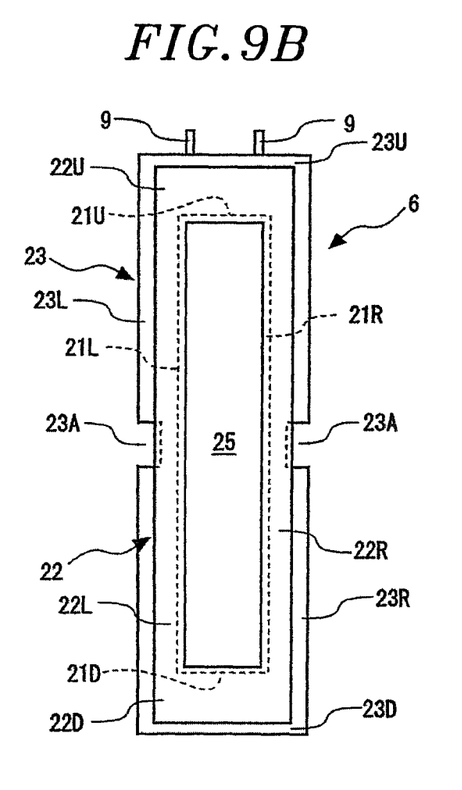
Figure 10:
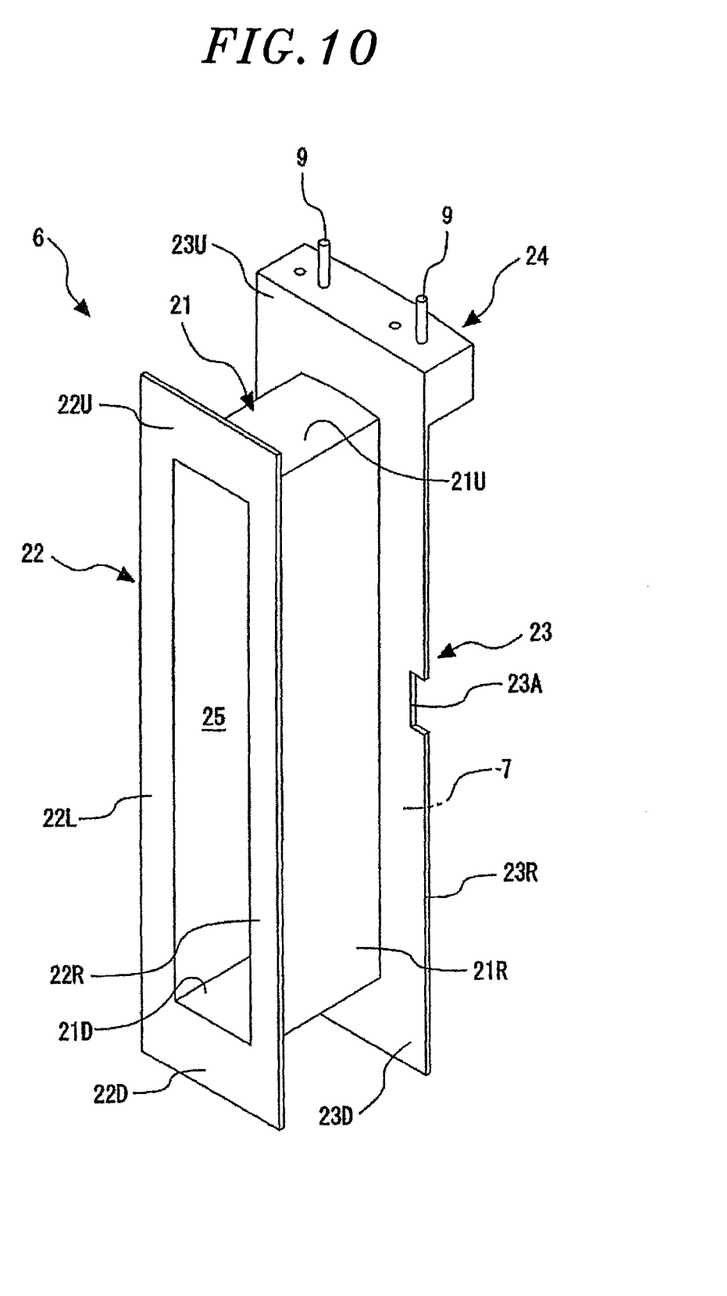
FIG. 10 is a perspective view showing the detailed structure of the bobbin shown in FIG. 9.

In the aforementioned embodiment, the recesses 22A as the back stress generating portions are formed in the second flange 22 of each of the bobbins 6. Alternatively, for example, as shown in FIGS. 9A, 9B and 10, outwardly-opened recesses 23A (long-side recesses) as back stress generating portions may be formed in the outer peripheral region of the first flange 23 of each of the bobbins 6 (specifically, the outer peripheral regions of the long-side flat plate portions 23L and 23R in the present modified example).

In the present modified example, as described above, the recesses 23A are formed in the long-side flat plate portions 23L and 23R of the first flange 23 which are easily deformed outward by the tension of the wound coil wire 7. This enables the long-side flat plate portions 23L and 23R to be easily deformed inward of the bobbin 6. As a result, as with the aforementioned embodiment, the deformation caused by the wound coil wire 7 can be suppressed without having to increase the thickness of the bobbin 6.

Figure 11:
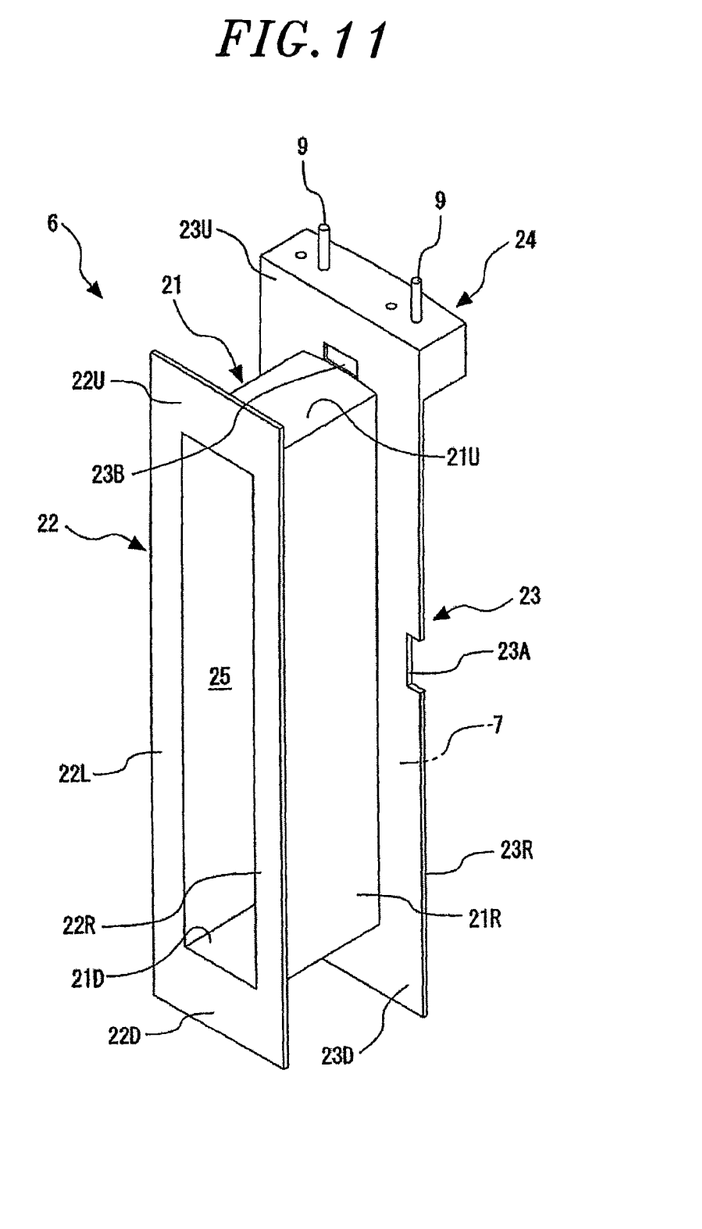
FIG. 11 is a perspective view showing the detailed structure of a bobbin according to a yet still further modified example, in which back stress generating portions are formed in long-side flat plate portions and short-side flat plate portions of a first flange.

(5) Formation of Back Stress Generating Portions in the Long-Side Flat Plate Portions and the Short-Side Flat Plate Portions of the First Flange In the present modified example, as shown in FIG. 11, the first flange 23 of each of the bobbins 6 includes not only the recesses 23A formed in the long-side flat plate portions 23L and 23R just like the aforementioned modified example (4) but also recesses 23B (short-side recesses) as back stress generating portions formed in the short-side flat plate portions 23U and 23D. In the present modified example, the recesses 23B are formed by making certain portions of the short-side flat plate portions 23U and 23D thinner than the remaining portions. Alternatively, the recesses 23B may be through-holes. Moreover, the recesses 23B may be formed into a cutout shape just like the recesses 22A.

According to the present modified example, as with the aforementioned modified example (4), the recesses 23A are formed in the long-side flat plate portions 23L and 23R which are easily deformed outward by the tension of the wound coil wire 7. This enables the long-side flat plate portions 23L and 23R to be easily deformed inward of the bobbin 6. In addition, the recesses 23B are formed in the short-side flat plate portions 23U and 23D. This enables the long-side flat plate portions 23L and 23R to be easily deformed inward of the bobbin 6. Thus, it is possible to enhance the effect of cancelling the deformation at the long side and the short side of the first flange 23. Moreover, it is possible to more reliably suppress the deformation of the bobbin 6 without having to increase the thickness of the bobbin 6.

(6) Modified Examples on the Number and Shape of Recesses

In the embodiment and the modified examples (1) to (5) described above, each of the rectangular recesses 21A, 21B, 22A, 22B, 23A and 23B is formed at one central point in each of the side surfaces 21L, 21R, 21U and 21D, each of the flat plate portions 22L, 22R, 22U and 22D and each of the flat plate portions 23L, 23R, 23U and 23D. However, the number and shape of the respective recesses are not particularly limited.

Figure 12A:
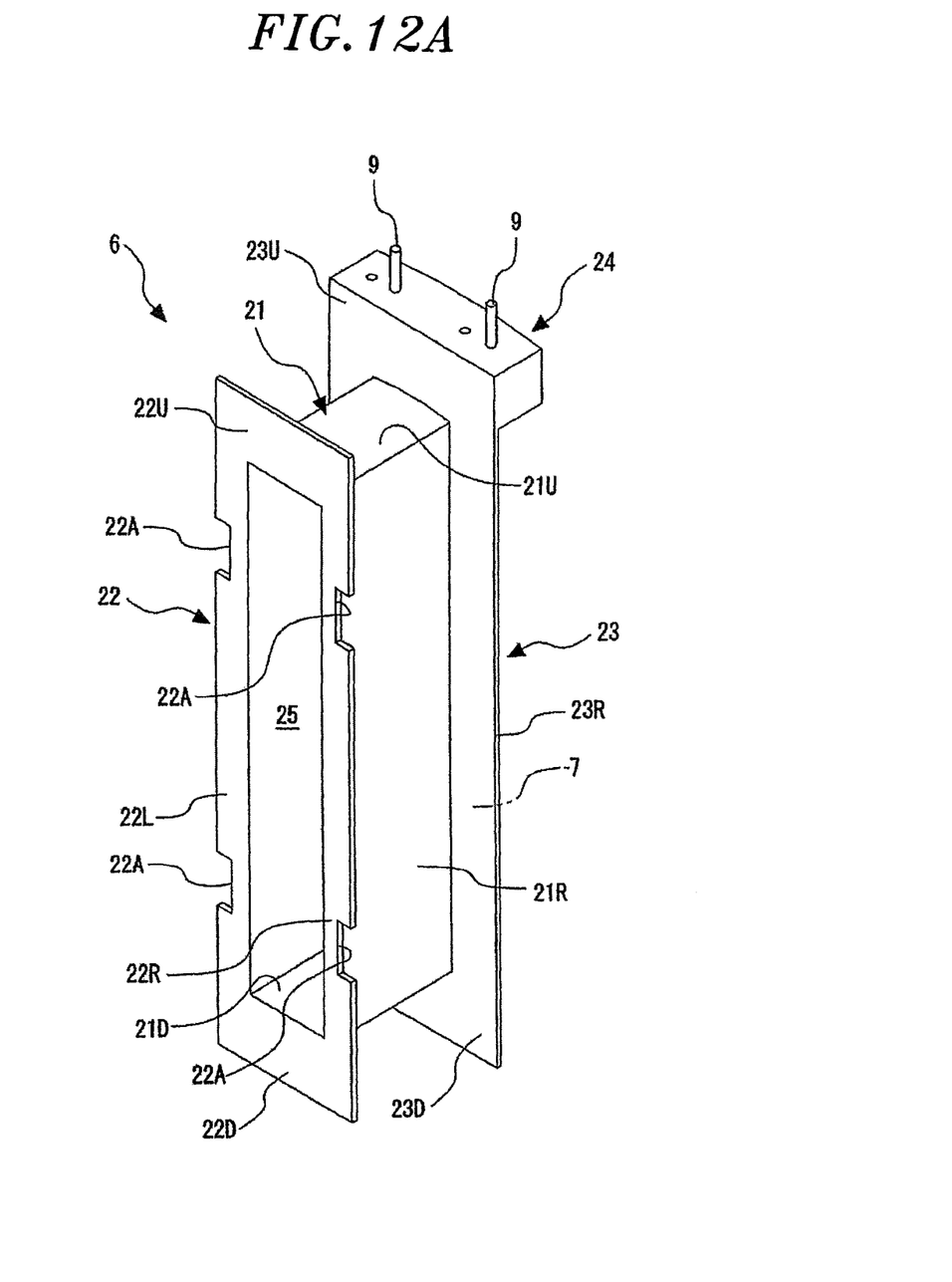
FIG. 12A is a perspective view showing the detailed structure of a bobbin according to a yet still further modified example, in which the number of recesses is changed.
Figure 12B:
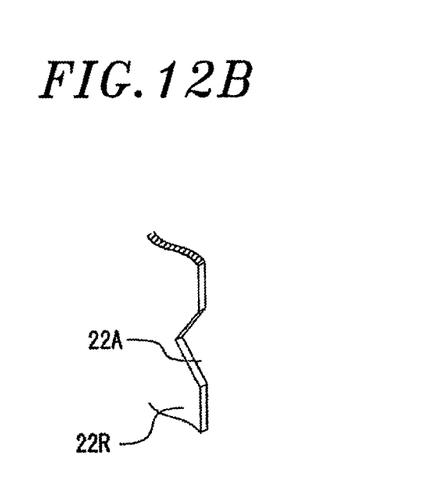
FIGS. 12B and 12C are enlarged perspective views showing major parts of bobbins according to yet still further modified examples, in which the recess is changed in shape.
Figure 12C:
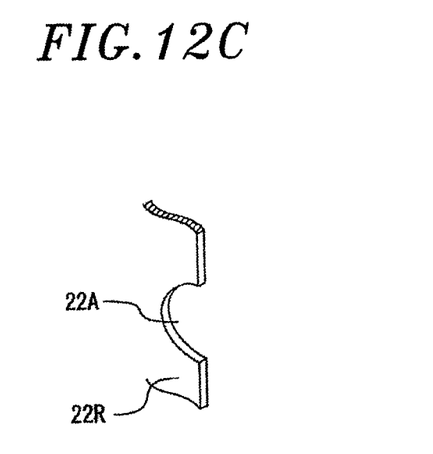

For example, in the example shown in FIG. 12A, recesses 22A are formed at two points rather than one central point along the longitudinal direction in the long-side flat plate portions 22L and 22R of the second flange 22 of each of the bobbins 6. The shape of the recesses 22A may be triangular as shown in FIG. 12B or may be arcuate as shown in FIG. 12C. Not only the number and shape of the recesses but also the size and position of the recesses may be appropriately changed depending on the shape and size of the bobbin 6 or the thickness and winding number of the coil wire 7.

In addition to the above, the embodiment and the respective modified embodiments may be appropriately combined.

While not specifically mentioned one by one, the present embodiment may be changed in many different forms without departing from the spirit thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A bobbin adapted to be mounted to a projection of a stator core of a rotary electric machine and wound with a coil wire, the bobbin comprising:
   a back stress generating portion configured to generate a stress acting in a direction opposite to a stress generated when the coil wire is wound around the bobbin;
   a quadrilateral frame-like body portion to be wound with the coil wire; and
   a flange provided around at least one end of an opening of the body portion,
   wherein the back stress generating portion is one or more recesses formed in at least one of the flange and the body portion,
   wherein each of the body portion and the flange includes lone sides and short sides, and
   wherein the recesses comprise long-side recesses respectively formed in outer pheripheral regions of long-side portions of the flange or the body portion corresponding to the long sides thereof.

2. The bobbin of claim 1, wherein the back stress generating portion is configured such that the portion where the back stress generating portion is provided is easily deformed either outward or inward of the bobbin.

3. The bobbin of claim 1, wherein the recesses comprise short-side recesses respectively formed in inner peripheral regions of short-side portions of the flange or the body portion corresponding to the short sides thereof.

4. The bobbin of claim 3, wherein the long-side recesses are formed in substantially center of the outer peripheral regions of the long-side portions of the flange or the body portion, or the short-side recesses are formed in substantially center of the inner peripheral regions of the short-side portions of the flange or the body portion.

5. The bobbin of claim 4, wherein the flange includes a first flange provided around one end of the opening of the body portion and a second flange provided around the other end of the opening of the body portion, the second flange being smaller in outer dimension than the first flange, and the recesses are formed in the second flange.

6. The bobbin of claim 3, wherein the flange includes a first flange provided around one end of the opening of the body portion and a second flange provided around the other end of the opening of the body portion, the second flange being smaller in outer dimension than the first flange, and the recesses are formed in the second flange.

7. The bobbin of claim 1, wherein the long-side recesses are formed in substantially center of the outer peripheral regions of the long-side portions of the flange or the body portion.

8. The bobbin of claim 7, wherein the flange includes a first flange provided around one end of the opening of the body portion and a second flange provided around the other end of the opening of the body portion, the second flange being smaller in outer dimension than the first flange, and the recesses are formed in the second flange.

9. The bobbin of claim 1, wherein the flange includes a first flange provided around one end of the opening of the body portion and a second flange provided around the other end of the opening of the body portion, the second flange being smaller in outer dimension than the first flange, and the recesses are formed in the second flange.

10. A rotary electric machine, comprising:
   a stator;
   a rotor; and
   the bobbin of claim 1.

11. A bobbin adapted to be mounted to a projection of a stator core of a rotary electric machine and wound with a coil wire, the bobbin comprising:
   a back stress generating portion configured to generate a stress acting in a direction opposite to a stress generated when the coil wire is wound around the bobbin;
   a quadrilateral frame-like body portion to be wound with the coil wire; and
   a flange provided around at least one end of an opening of the body portion,
   wherein the back stress generating portion is one or more recesses formed in at least one of the flange and the body portion,
   wherein each of the body portion and the flange includes long sides and short sides, and
   wherein the recesses comprise short-side recesses respectively formed in inner peripheral regions of short-side portions of the flange or the body portion corresponding to the short sides thereof.

12. The bobbin of claim 11, wherein the short-side recesses are formed in substantially center of the inner peripheral regions of the short-side portions of the flange or the body portion.

13. The bobbin of claim 12, wherein the flange includes a first flange provided around one end of the opening of the body portion and a second flange provided around the other end of the opening of the body portion, the second flange being smaller in outer dimension than the first flange, and the recesses are formed in the second flange.

14. The bobbin of claim 11, wherein the flange includes a first flange provided around one end of the opening of the body portion and a second flange provided around the other end of the opening of the body portion, the second flange being smaller in outer dimension than the first flange, and the recesses are formed in the second flange.

15. A rotary electric machine, comprising:
   a stator;
   a rotor; and
   the bobbin of claim 11.

16. A bobbin adapted to be mounted to a projection of a stator core of a rotary electric machine and wound with a coil wire, the bobbin comprising:
   a back stress generating portion configured to generate a stress acting in a direction opposite to a stress generated when the coil wire is wound around the bobbin;
   a quadrilateral frame-like body portion to be wound with the coil wire; and
   a flange provided around at least one end of an opening of the body portion,
   wherein the back stress generating portion is one or more recesses formed in at least one of the flange and the body portion, and
   wherein the flange includes a first flange provided around one end of the opening of the body portion and a second flange provided around the other end of the opening of the body portion, the second flange being smaller in outer dimension than the first flange, and the recesses are formed in the second flange.

* * * * *